United States Patent
Colding-Kristensen et al.

(10) Patent No.: US 6,564,930 B1
(45) Date of Patent: May 20, 2003

(54) FRICTION DRIVEN FLEXIBLE, ENDLESS CONVEYOR BELT

(75) Inventors: Holger Colding-Kristensen, Hals (DK); Helge Bjoern, Saeby (DK)

(73) Assignee: Scanima A/S, Aalborg (DK)

( * ) Notice: Subject to any disclaimer, the term of this patent is extended or adjusted under 35 U.S.C. 154(b) by 0 days.

(21) Appl. No.: 09/980,189

(22) PCT Filed: May 31, 2000

(86) PCT No.: PCT/DK00/00294

§ 371 (c)(1),
(2), (4) Date: Nov. 30, 2001

(87) PCT Pub. No.: WO00/76886

PCT Pub. Date: Dec. 21, 2000

(30) Foreign Application Priority Data

Jun. 1, 1999 (DK) .......................................... 199 00775

(51) Int. Cl.[7] ....................... B65G 13/02; B65G 21/18; B65G 15/02; B65G 21/16
(52) U.S. Cl. ....................................... 198/778; 198/831
(58) Field of Search ................................. 198/778, 831, 198/850

(56) References Cited

U.S. PATENT DOCUMENTS

| | | | | | |
|---|---|---|---|---|---|
| 3,348,659 | A | * | 10/1967 | Roinestad | 198/778 |
| 4,858,750 | A | | 8/1989 | Cawley | |
| 4,924,998 | A | * | 5/1990 | Fuller, Jr. | 198/778 |
| 5,191,267 | A | * | 3/1993 | Machacek | 198/778 |
| 5,467,865 | A | * | 11/1995 | Irwin | 198/778 |
| 5,590,755 | A | | 1/1997 | Daringer et al. | |

FOREIGN PATENT DOCUMENTS

| | | |
|---|---|---|
| EP | 293 095 | 5/1988 |
| EP | 479 936 | 6/1990 |
| SE | 469 752 | 9/1993 |
| WO | 94/25378 | 11/1994 |

* cited by examiner

Primary Examiner—Christopher P. Ellis
Assistant Examiner—Gene O Crawford
(74) Attorney, Agent, or Firm—Renner, Otto, Boisselle & Sklar, LLP

(57) ABSTRACT

An endless conveyor has a driven drum that rotates about its axis. A flexible band forms a helix by being wrapped around the drum. A fixed helical support supports the outer edge of the band. A secondary conveyor moves an endless series of stacking blocks. The stacking blocks are in frictional engagement with the drum to transfer driving forces from the drum to the blocks. The stacking blocks also keep the turns of the flexible band spaced apart by a distance equal to the height of the blocks. The secondary conveyor includes guides at both the top and bottom of the drum to guide the stacking blocks into and out of engagement with the inner edge of the flexible band. The stacking blocks are in slip-free and backlash free engagement with the inner edge of the flexible band, and the frictional engagement between the stacking blocks and the drum permits the stacking blocks to be displaced both axially and circumferentially on the surface of the drum.

4 Claims, 4 Drawing Sheets

FRICTION DRIVEN FLEXIBLE, ENDLESS CONVEYOR BELT

The present invention relates to an endless band conveyor of the flexible type having a band portion which is caused to follow a helicoidal path of transport consisting of a plurality of band windings stacked one upon the other, wherein the helicoidal band portion is supported, at the outer edge thereof, by a fixed helicoidal support bar and, at the inner edge thereof, by each band winding being supported by an underlying winding through an extra conveyor comprising an endless line of stacking blocks, said blocks keeping successive band windings at a distance from each other defined by the height of the blocks so as to provide spacings between the stacked band windings, and said blocks being adapted to transfer driving forces from an inner drum to the inner edge of the band, and whereby said line of stacking blocks, at the respective lower and upper ends of the helicoidal band portion, is guided by guiding means into support of or from support of, respectively, the inner edge of the helicoidal band portion.

BACKGROUND OF THE INVENTION

In a band conveyor of the type disclosed in EP 0293095, the conveyor band is, at the inner edge thereof, supported and frictionally advanced in the helicoidal path by the stacking blocks of an extra conveyor, the blocks having a height defining the desired spacing between two successive windings in the stack of helicoidal band windings.

The band conveyor thus known, has the drawback that the conveyor band thereof is subjected to wear and tear at its inner edge due to the frictional contact with the stacking blocks which, in turn, are subjected to wear and tear by the inner edge of the band, and consequently the conveyor band which represents large costs, has to be replaced just because the inner edge has been worn out, whereas the remaining part of the band may be as good as new.

SUMMARY OF THE INVENTION

It is the object of the invention to remove this drawback while simultaneously concentrating the most essential wear and tear at component parts which are relatively easy to exchange and are less costly than the conveyor band.

In accordance with the invention this is achieved in that the driving drum has circumferential and frictional engagement with the stacking blocks which are acting as liners between the drum and the band, in that those of the stacking blocks being in contact with the drum, are in slip-free or backlash-free mechanical engagement with the radially innermost edge of the band, and in that the frictional engagement of the drum with the stacking blocks of the extra conveyor allows the blocks to be displaced not only along the surface of the drum axially thereof, but also along the surface of the drum circumferentially thereof.

Hereby is achieved that the band conveyor—in addition to being economically constructible by use of standard conveyor bands without particularly designed edge areas—is able to avoid the heavy wear and tear on the inner edge of the conveyor band and to have the wear and tear limited substantially to the extra conveyor alone, so that it is sufficient to replace the worn out stacking blocks without having to replace the flexible band at the same time.

Moreover, the band conveyor of this invention may expediently include firmly anchored slide bars in the surface of the driving drum, said slide bars providing the frictional engagement of the drum with the stacking blocks during said frictional engagement of the extra conveyor with drum.

By means of friction between the slide bars of the drum and the stacking blocks of the extra conveyor, driving forces are transferred from the rotating drum to the stack of band windings. Hereby the band is affected by driving forces along the entire length in the stack of band windings, and the wear and tear on the drum due to the frictional engagement with the extra conveyor is limited to the replaceable slide bars.

Furthermore, the band conveyor of the invention may advantageously have stacking blocks which include coupling means adapted to be brought into and out of locking engagement with the inner edge of the band before and after the formation of the helicoidal stack of windings.

In a preferred embodiment the band is hereby prevented from being displaced relative to the extra conveyor, and mutual wear and tear is thereby prevented. Moreover, the band is prevented from moving away from the drum and out of the stacking blocks of the extra conveyor, for instance during standstill without longitudinal pulling forces in the band.

BRIEF DESCRIPTION OF THE DRAWINGS

The following specification explains the invention in further details with reference to the drawings, wherein.

DETAILED DESCRIPTION

Figure 1:
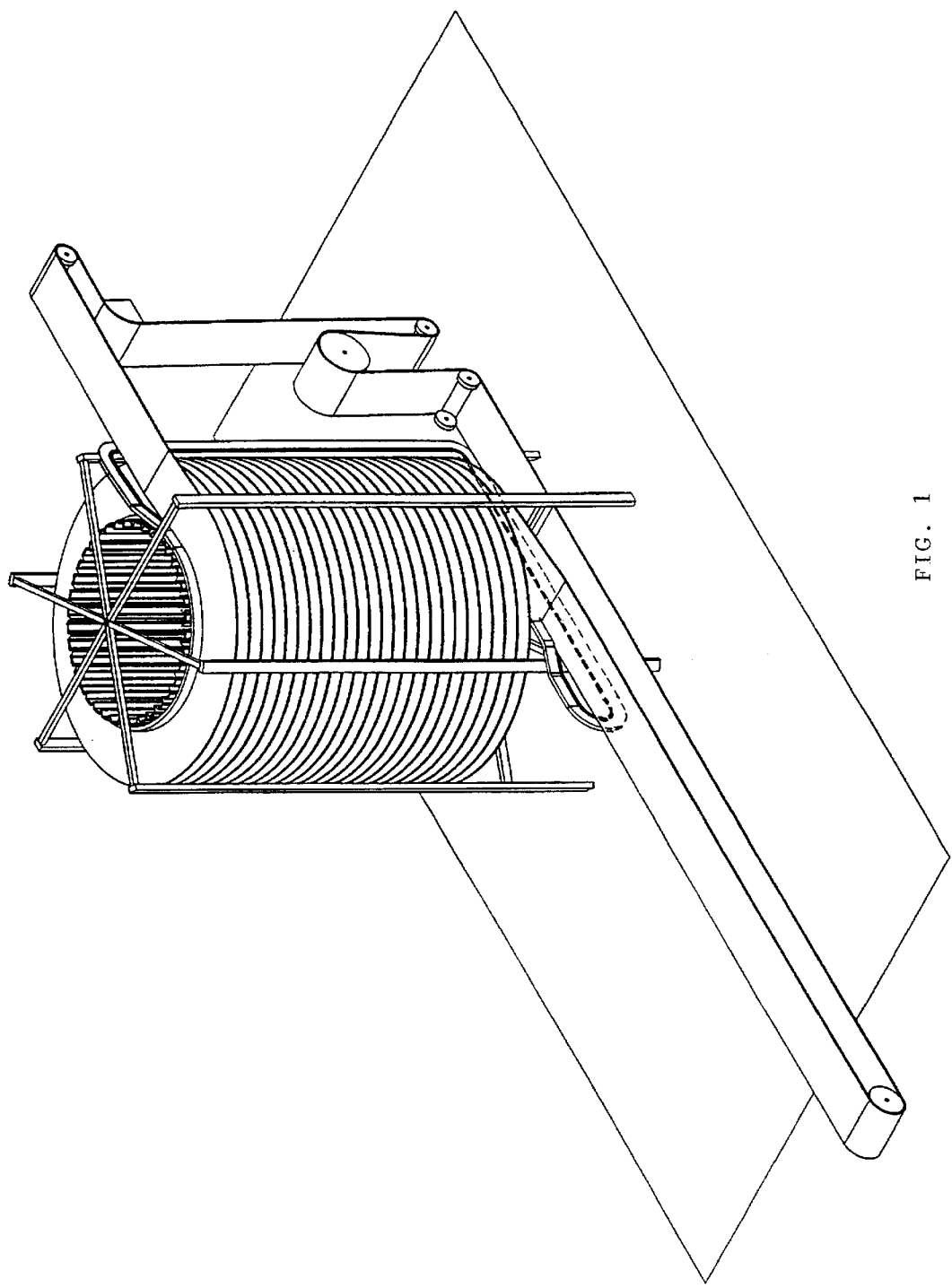
FIG. 1 is a perspective view of a support frame with a band conveyor of the invention in a conveyor system arranged in a treatment chamber, the rectangular base plan thereof being marked.

Referring now to the drawings, FIG. 1 shows a support frame 9, the driving drum 6 and the conveyor band 1 in its course or path outside of the helicoidal band stack 7 guided by rollers 2 and in its course or path within the band stack 7. Outside of the band stack 7 a channel system may transport an extra conveyor which comprises a number of interconnected stacking blocks 4, from one end of the band stack 7 to the other. Drive means for rotating the driving drum 6 can be arranged beneath the support frame 9.

Figure 2:
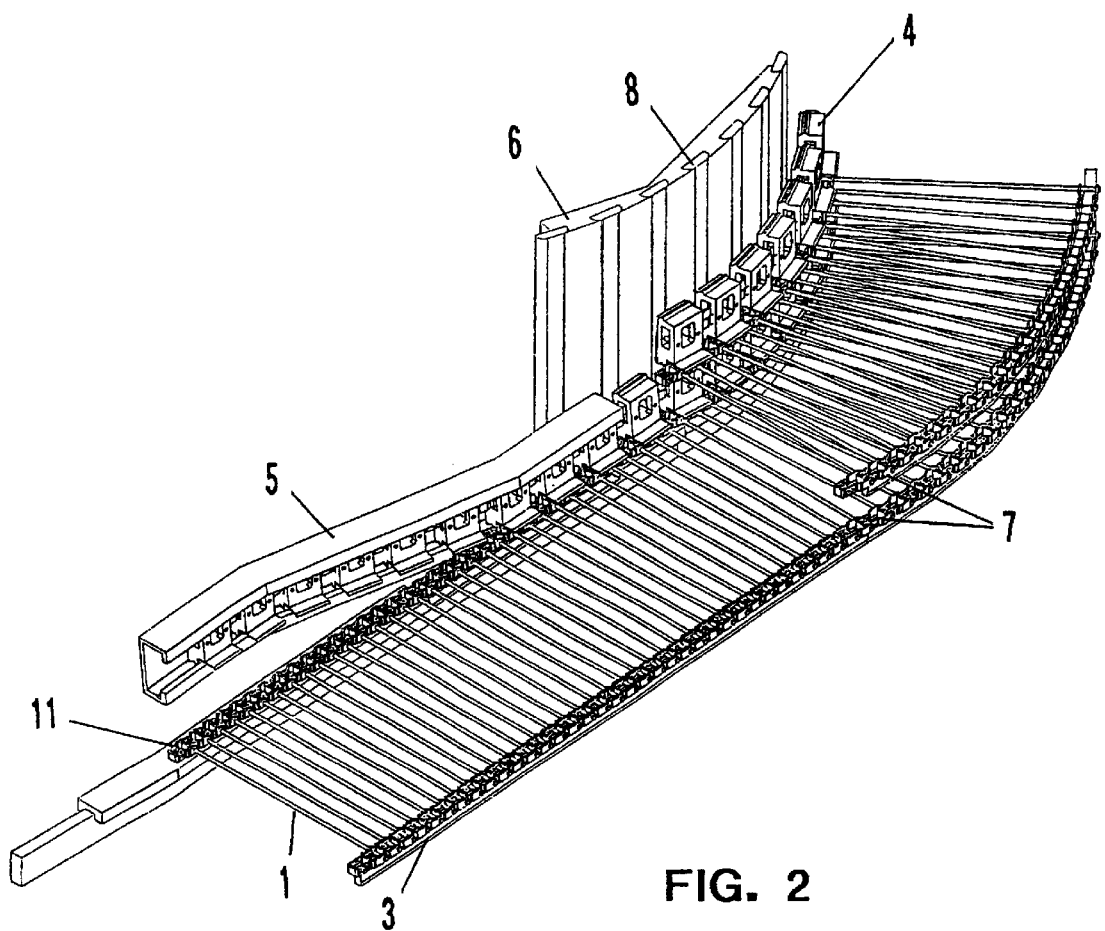
FIG. 2 is showing the introduction of the band and an extra conveyor in form of a line or row of stacking blocks into the lower end of a helicoidal band stack.

FIG. 2 shows guiding means 5 guiding the stacking blocks 4 of the extra conveyor into the band stack 7 and into positive mechanical engagement with the inner edge area 11 of the conveyor band 1. The guiding means 5 has the form of a U-shaped guideway which, from the outside, is brought up to the support frame 9, then extends one winding around of this and is secured to the frame. In the helicoidal winding stack 7 the stacking blocks 4 bear against the slide bars 8 which are anchored in the driving drum 6.

Figure 3:
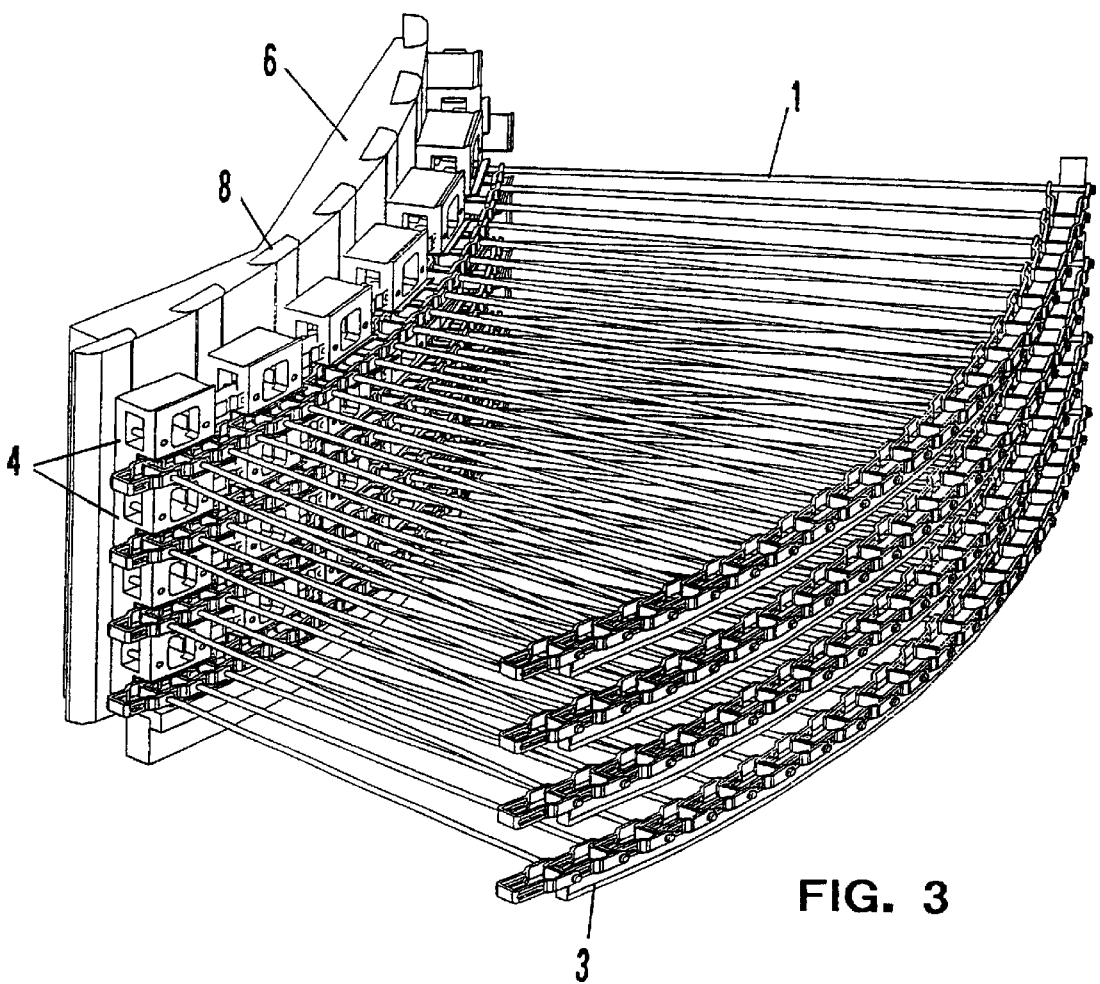
FIG. 3 is showing a part of a driving drum with slide bars together with associated parts of four layers or windings in the helicoidal band stack.

FIG. 3 shows an embodiment of the driving drum 6 with firmly anchored slide bars 8 being in friction providing contact with blocks in the chain or line of stacking blocks 4, and helicoidal windings of the conveyor band 1 are seen to have inner edge areas thereof in positive or slip-free mechanical engagement with the stacking blocks 4. Moreover, helicoidal supporting means, shown as a support bar 3, are secured to the support frame 9 and are supporting the outer edge area of the conveyor band 1 in the helicoidal stack 7 of band windings.

Figure 4:
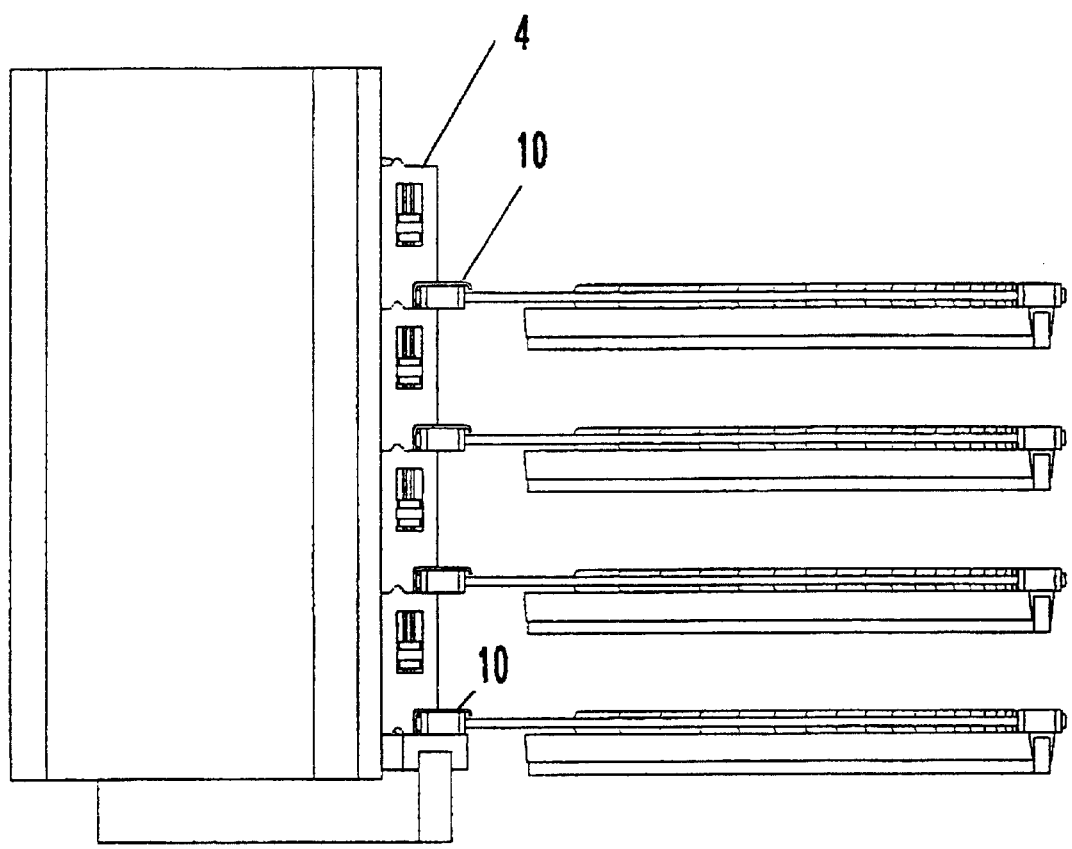
FIG. 4 is showing details among others of the interconnections between the stacking blocks and the inner edges of the four band windings in the helicoidal stack.

FIG. 4 shows coupling means 10 on the stacking blocks 4, the coupling means comprising a projection on the upper side of the blocks and a recess which is complementary to the projection, on the lower side of the blocks with the purpose of preventing radial displacements between the stacking blocks 4 of the extra conveyor in the helicoidal stack.

The invention is in no way restricted to the embodiments disclosed in the present application, in as much as other embodiments can be implemented within the scope of the invention.

What is claimed is:

1. An endless, flexible conveyor comprising a inner drum driven to rotate about an axis;

a flexible band having a helicoidal portion about the drum, the helicoidal portion including a plurality of windings stacked one upon another, the helicoidal portion having an outer edge and an inner edge;

a helicoidal support bar supporting the outer edge of the helicoidal portion; and a secondary conveyor having an endless series of stacking blocks, the stacking blocks being adapted to transfer driving forces from the drum to the inner edge of the helicoidal portion of the flexible band and to keep successive windings of the helicoidal portion at an axial distance from each other defined by the height of the blocks;

the secondary conveyor further including a guide means at the upper and lower end portion of the helicoidal portion of the flexible band for guiding the support blocks respectively into and out of supporting engagement of the inner edge of the flexible band;

the drum transferring driving forces to the blocks through frictional engagement between the circumference of the drum and the blocks;

the blocks in said engagement with the drum acting in slip-free and backlash-free mechanical engagement with the inner edge of the helicoidal portion of the flexible band and so act as liners between the drum and the flexible band; and the frictional engagement between the drum and the stacking blocks of the secondary conveyor enabling the stacking blocks to be displaced both axially and circumferentially along the surface of the drum.

2. The conveyor of claim 1, wherein the helicoidal portion of the flexible band has a beginning and an end, and the stacking blocks each include a coupling adapted to be brought into and out of locking engagement with the inner edge of the flexible band at the beginning and end of the flexible band.

3. The conveyor of claim 1, further including slide bars firmly anchored to the circumferential surface of the drum to provide the frictional engagement between the drum and the stacking blocks.

4. The conveyor of claim 3, wherein the helicoidal portion of the flexible band has a beginning and an end, and the stacking blocks each include a coupling adapted to be brought into and out of locking engagement with the inner edge of the flexible band at the beginning and end of the helicoidal portion of the flexible band.

* * * * *